United States Patent [19]

Maxemchuk

[11] 4,110,735
[45] Aug. 29, 1978

[54] ERROR DETECTION AND CORRECTION

[75] Inventor: Nicholas Frank Maxemchuk, Mercerville, N.J.

[73] Assignee: RCA Corporation, New York, N.Y.

[21] Appl. No.: 796,339

[22] Filed: May 12, 1977

[51] Int. Cl.² ............................................. G06F 11/12
[52] U.S. Cl. .......................................... 340/146.1 AQ
[58] Field of Search .............................. 340/146.1 AQ

[56] References Cited

U.S. PATENT DOCUMENTS

| 3,227,999 | 1/1966 | Hagelbarger | 340/146.1 AQ |
|---|---|---|---|
| 3,469,236 | 9/1969 | Gallager | 340/146.1 AQ |
| 3,500,320 | 3/1970 | Massey | 340/146.1 AQ |
| 3,571,795 | 3/1971 | Tong | 340/146.1 AQ |

OTHER PUBLICATIONS

Peterson and Weldon, Error Correcting Codes, The MIT Press, 1972, pp. 404–409.

Primary Examiner—Charles E. Atkinson
Attorney, Agent, or Firm—H. Christoffersen; Samuel Cohen; Carl V. Olson

[57] ABSTRACT

An error detection and correction system in which at least the highest order bit of each data word is given a greater protection against errors in transmission than lower order bits. Useful for digitized TV signals where errors in received high order bits have much worse effect on picture quality than errors in low order bits. A parity is generated for each data word in accordance with a self-orthogonal convolutional code constructed by the use of the base elements of a difference triangle for each bit of the data word, the difference triangles being disjoint, the triangle associated with the highest order bit or bits having a large number or numbers of base elements, and the triangles associated with the lowest order protected bit or bits consisting of a single base element. Errors in received code words are detected and corrected in a decoder including majority logic threshold detectors.

6 Claims, 4 Drawing Figures

ERROR DETECTION AND CORRECTION

Television signals, for example, may advantageously be converted from analog form to digital pulse-code-modulation (PCM) form for transmission. If each analog picture element is converted to a six-bit data word, for example, for transmission, each data word represents one of 64 quantized levels of the analog signal. If an error occurs in the lowest order bit, the error causes the corresponding reproduced TV picture element to be only one of the 64 levels different from intended. However, an error in the highest order bit causes a corresponding reproduced TV picture element to be 32 of the 64 levels different from intended. It is therefore desirable to transmit each data word with a parity bit generated from the data word in such a manner as to provide a substantially greater probability of detecting and correcting errors in received high order bits of data words than in received low order bits.

The conventional technique for increasing the redundancy of certain bits more than others, is to use different error correcting codes for each of the bits. This implies separate encoders and decoders for each bit, and synchronization schemes which allow different numbers of redundant bits to be inserted and extracted. It is desirable to employ a coding scheme which provides different amounts of redundancy to the different bits in the code word, and which uses a single encoder and decoder.

According to an aspect or example of the invention, at least the highest order bit of each transmitted data word is protected to a greater degree than low order bits by generating, in an encoder, a parity bit for each data word according to a self-orthogonal convolutional code constructed by the use of base elements of a disjoint difference triangle for each of the bits of the data word, the triangle associated with the highest order bit having a largest number of base elements and the triangle associated with the lowest order bit having only one base element.

Figure 1:
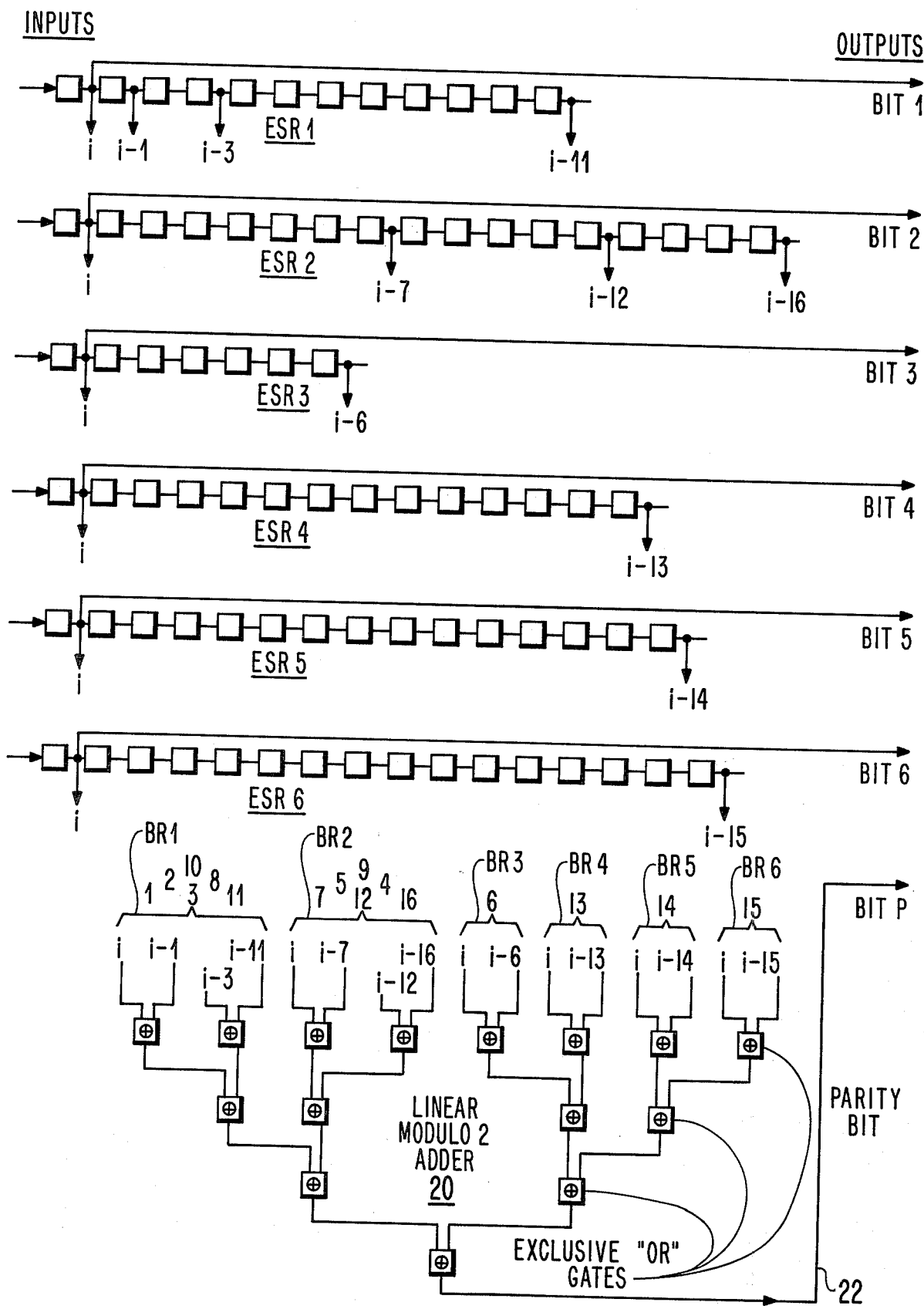
FIG. 1 is a schematic diagram of an encoder constructed according to the teachings of the invention.

FIG. 1 shows an encoder which generates one parity bit for every six-bit data word transmitted. Encoder shift registers ESR1 through ESR6 are provided for data bits 1 through 6 which are applied in parallel to the inputs of the shift registers. Each square box of a shift register represents one stage. When six data bits are present at the output of the six input stages of the six shift registers, the seventh and higher numbered stages of the shift registers contain previously received and transmitted bits of the data words. Certain stages of the shift registers are provided with outputs in accordance with the base elements of a specific six-bit convolutional code, constructed by a technique using disjoint difference triangles, shown in FIG. 1 as follows:

```
        10          9
   2  8        5  4
 1  3   11  7   12   16   6   13   14   15.
   Bit 1        Bit 2       Bit 3 Bit 4 Bit 5 Bit 6
```

The bit 1 triangle has three base elements 1, 3 and 11 corresponding with taps $i$-1, $i$-3 and $i$-11 at the outputs of the first, third and 11th stages, following the input stage of shift register ESR1. Similarly, the bit 2 triangle has base elements 7, 12 and 16 determining taps on encoder shift register ESR2. Bits 3, 4, 5 and 6 have single-element triangles determining corresponding taps on encoder shift registers ESR3, ESR4, ESR5 and ESR6.

The triangles are called disjoint triangles because they have distinct elements 1 through 15 no one of which is used more than once. Each triangle for bits 1 and 2 is called a difference triangle because the numbers above the base of the triangle are the set of all the positive differences between the base elements of the triangle. The numbers above the base numbers correspond to all positive differences between the indices of the bits employed in the calculation of the syndromes. The code is called a self-orthogonal code because the snydrome equations used to determine a particular data bit contain that bit in all of the syndrome equations, but contain the other received bits in at most one of these equations.

Appendix A of this patent specification is a tutorial on convolutional codes generated from disjoint difference triangles, for use in error detecting and correcting systems. The described codes, in which the triangles for the respective data bits are of equal size with an equal number, such as three, of base elements, provide substantially equal protection for all the bits of a data word.

However, the convolutional code employed in the apparatus described herein by way of example is different in that the disjoint difference triangles for bits 1 and 2 have three base elements (1, 3 and 11; and 7, 12 and 16, respectively) and the disjoint difference triangles for bits 3, 4, 5 and 6 each have one base element (6, 13, 14 and 15, respectively). The high order bits have a higher number of base elements than the low order bits. This results in a higher error protection for the high order bits than for the low order bits. As long as the triangles remain disjoint, the orthogonal property of the syndrome is maintained, and error correction can be performed in the same manner as is described in the Appendix. When the code described herein is used with a transmission channel having an error rate of $10^{-3}$, the bits of the data word may have error rates computed to be as follows:

| Bit 1 | $5.5 \times 10^{-6}$ |
| Bit 2 | $1.4 \times 10^{-5}$ |
| Bit 3 | $1.2 \times 10^{-4}$ |
| Bit 4 | $1.9 \times 10^{-4}$ |
| Bit 5 | $2.1 \times 10^{-4}$ |
| Bit 6 | $2.3 \times 10^{-4}$ |

The convolutional code employed herein is also characterized in that the syndrome equations, used to correct a particular data bit, include both data bits preceding that bit and data bits following that bit. The data bits preceding the bit to be corrected have already gone through the correction procedure, and, therefore, are less likely to be in error than the bits following the bit to be corrected. Even if two difference triangles have the same number of base elements, and the same number of total bits in the syndrome calculation, one will contain more bits preceding the data bit. The probability of error using this difference triangle will be lower than the probability of error using the other difference triangle. If both difference triangles are assigned to bits in a PCM system, the one containing more corrected bits should be assigned to the higher order PCM bit.

The taps on the shift register ESR1 through ESR6 are connected to correspondingly labeled inputs of a linear modulo 2 adder 20 consisting of an "or" gate tree. More specifically, the taps on shift register ESR1 are connected to the inputs of the adder 20 which are embraced by bracket BR1. Similarly, the taps on shift registers ESR2 through ESR6 are connected to the inputs of the adder 20 which are embraced by brackets BR2 through BR6, respectively. The adder 20 produces at its output 22 a parity bit P for every data word for six bits applied in parallel to the inputs of the six shift registers. Each output six-bit data word together with the one parity bit constitute a code word from the encoder of FIG. 1. The particular six-bit encoder illustrated in FIG. 1, and the particular self-orthogonal convolutional code upon which it is based using disjoint difference triangles, provide the highest degree of error protection for the highest order bit 1, somewhat less protection for bit 2, and progressively less protection for lower order bits 3, 4, 5 and 6. It will be understood that the encoder described is just one example of many that can be constructed for data words including more than, or fewer than, six bits, and providing varying amounts of protection for the bits of the data word.

Figure 2:
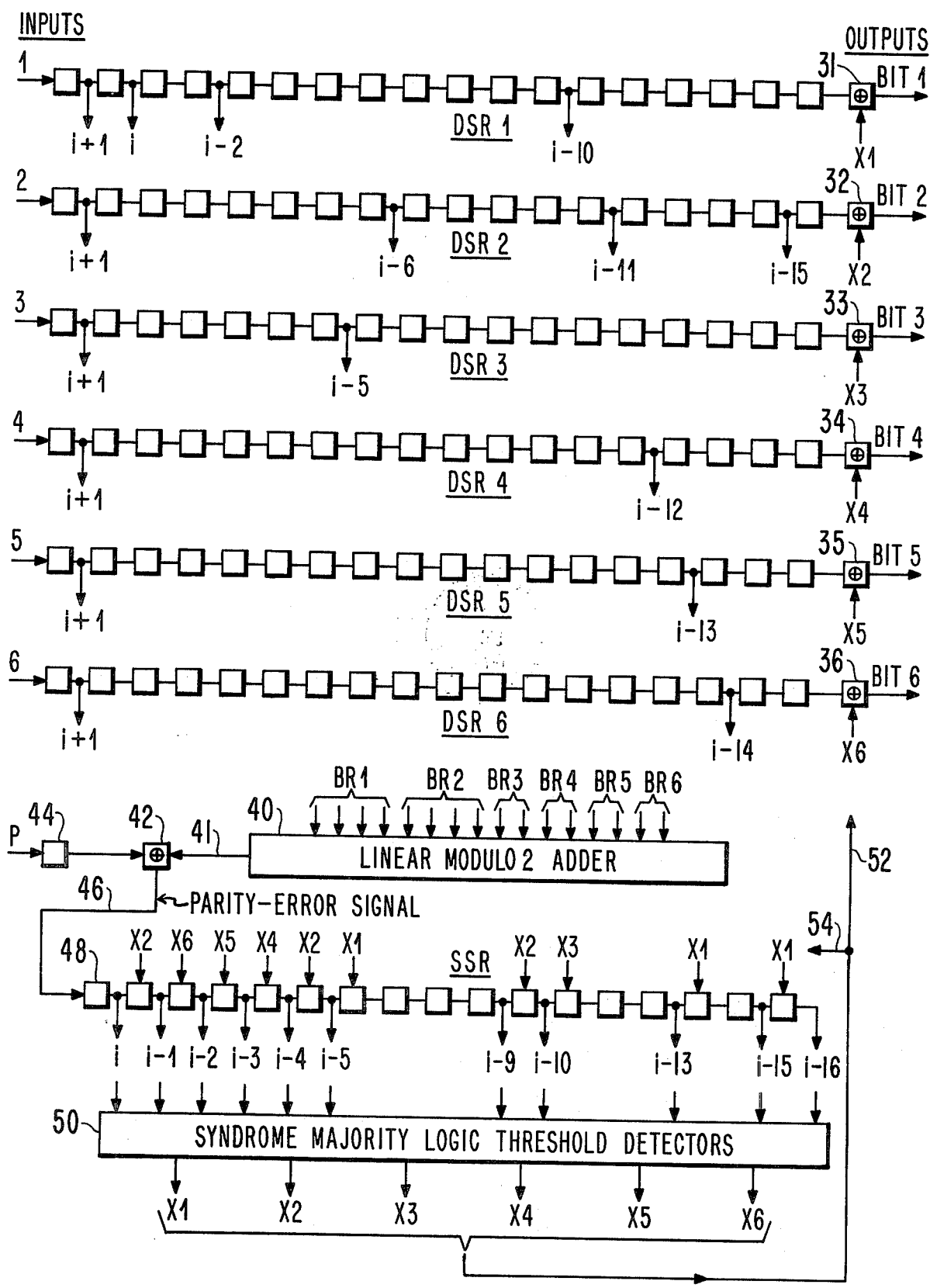
FIG. 2 is a schematic diagram of a decoder for use on signals encoded by the means shown in FIG. 1.

FIG. 2 is a decoder for code words received over a communications path from a distant encoder according to FIG. 1. The decoder has six decoder shift registers DSR1 through DSR6 for received data bits 1 through 6. The decoder shift registers DSR have taps from input stages and succeeding intermediate stages spaced from input stages by the exact same amounts as the encoding shift registers ESR in FIG. 1. The decoder shift registers DSR additionally have uniformly-distant terminal stages providing outputs to respective output exclusive "or" gates 31 through 36.

The taps from input and intermediate stages of decoder shift registers DSR1 through DSR6 are coupled over paths not shown to inputs of a linear modulo 2 adder 40, which may be constructed exactly the same as the adder 20 in FIG. 1. More specifically, the taps from shift register DSR1 are connected to the inputs of adder 40 embraced by bracket BR1 in FIGS. 2 and 1. Similarly, the taps from shift registers DSR2 through DSR6 are connected to the inputs of adder 40 embraced by brackets BR2 through BR6, respectively, in FIGS. 2 and 1. The taps on the shift registers DSR1 through DSR6 in FIG. 2 bear designations displaced by one from the designations of the corresponding taps on the shift registers ESR1 through ESR6 in FIG. 1. This is because of a one-bit-time delay of the signals at receiving decoder of FIG. 2 compared with the signals at the transmitting encoder of FIG. 1. The modulo 2 adder 40 generates a parity bit at 41 based on the received bits, for comparison with the received parity bit which was generated in the encoder of FIG. 1. For this purpose, the output 41 of the adder 40 is applied to one input of an exclusive "or" gate 42, which is also receptive to the received parity bits from a stage 44. The gate 42 produces a parity-error signal output which is a "0" when the received and locally-generated parity bits are the same, and is a "1" when they are different.

Figure 3:
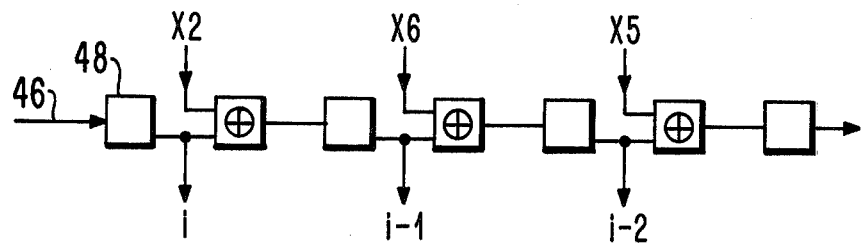
FIG. 3 is a detailed diagram of a portion of the snydrome storage shift register in FIG. 2.

The parity-error signals on line 46 from gate 42 are applied to the input stage 48 of a syndrome storage shift register SSR. Each sequential stage of the register has a labeled output, and some of the stages are also responsive to inputs labeled X1 through X6, which complement the contents of the stages of the register. The complementing may be accomplished by the use of exclusive "or" gates in the couplings between stages of the syndrome shift register after the manner shown in greater detail in FIG. 3 for the first three stages of the syndrome shift register SSR of FIG. 2.

Figure 4:
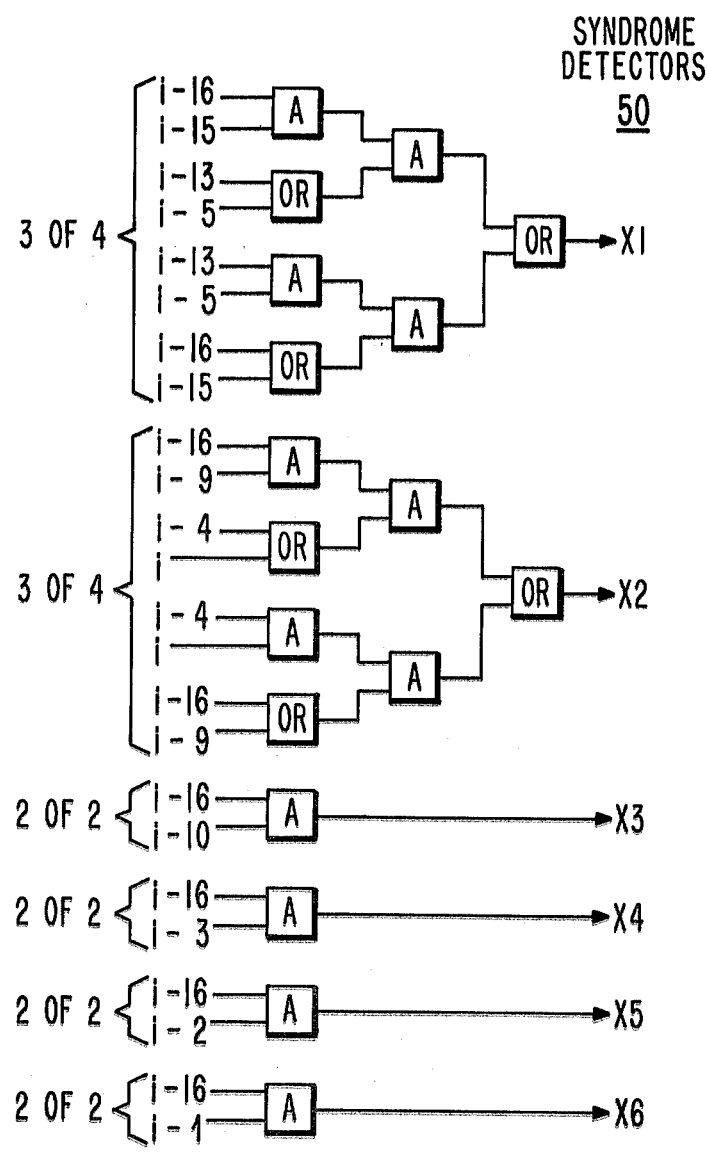
FIG. 4 is a detailed logic diagram of syndrome majority logic threshold detectors useful in a block shown in FIG. 2.

Outputs of indicated ones of the stages of syndrome shift register SSR are coupled to inputs of syndrome majority logic threshold detectors 50, which are shown in detail in FIG. 4 to consist of "and" gates A and "or" gates OR. These syndrome detectors provide outputs X1 through X6 for correcting errors in respective received data bits 1 through 6. The detectors for data bits 1 and 2 provide outputs X1 and X2, respectively, when three out of four of the inputs to the detectors are "1" or true. The detectors for data bits 3 through 6 provide outputs X3 through X6, respectively, when two out of two inputs to the detectors are "1" or true. The outputs X1 through X6 of the syndrome detectors 50 are applied over six-conductor line 52 are error-correcting signals to respective exclusive "or" gates 31 through 36. An error-corrected six-bit data word appears at the outputs of gates 31 through 36.

The error-correcting signals X1 through X6 are also applied over six-conductor lines 54 to complementing inputs of designated ones of the stages of the syndrome storage shift register SSR for the purpose of complementing or correcting the parity-error signals propagated through the syndrome register. This prevents a data bit error, which is being corrected, from adversely affecting the detection and correction of subsequent data bits.

The direct and feedback connections in the loop including the syndrome storage shift register SSR and the syndrome majority logic threshold detectors 50 are made in accordance with syndrome equations which are derived from the parity equation in a manner well known to those skilled in the art. An understanding of how the concentrations are made can be had by considering the sequence of events, after the system is in operation following the receipt of a data word and associated parity bit by the decoder of FIG. 2.

A received parity bit in stage 44 was calculated using bits of the present data word in the input stages of decoder shift registers DSR1 through DSR6, and some bits of 16 preceding data words. These preceding data words are present in the stages of the encoder shift registers of FIG. 1 and the stages of the decoder shift registers of FIG. 2. The received parity bit in stage 44 is compared in gate 42 with the locally-generated parity bit from adder 40, and the resulting parity-error signal is applied to the first stage 48 of the syndrome storage shift register SSR.

The received data word and the associated parity-error bit are then propagated to the right, and when they reach the ends of the respective shift registers, the syndrome storage shift register SSR contains parity-error bits associated with all the preceding data words used in calculating the parity of the data bit in the last stages of the shift register DSR1 through DSR6. Consequently, the taps on the syndrome storage shift register SSR used by the syndrome detectors 50 are in a reversed order compared with the taps on the data word shift registers DSR1 through DSR6. Corresponding encoder taps, decoder taps and syndrome taps for designated ones of the data bits 1 through 6 are shown in Table I.

TABLE I

| ENCODER TAPS | DECODER TAPS | SYNDROME TAPS | FOR DATA BITS |
|---|---|---|---|
| i | i+1 | i-16 | 1,2,3,4,5,6 |
| i-1 | i | i-15 | 1 |
| i-2 | i-1 | i-14 | |
| i-3 | i-2 | i-13 | 1 |
| i-4 | i-3 | i-12 | |
| i-5 | i-4 | i-11 | |
| i-6 | i-5 | i-10 | 3 |
| i-7 | i-6 | i-9 | 2 |
| i-8 | i-7 | i-8 | |
| i-9 | i-8 | i-7 | |
| i-10 | i-9 | i-6 | |
| i-11 | i-10 | i-5 | 1 |
| i-12 | i-11 | i-4 | 2 |
| i-13 | i-12 | i-3 | 4 |
| i-14 | i-13 | i-2 | 5 |
| i-15 | i-14 | i-1 | 6 |
| i-16 | i-15 | i | 2 |

The syndrome taps used for designated data bits in Table I are connected to inputs of the six syndrome detectors, one for each data bit, shown in FIG. 4. The detectors provide bit correction signals X1 through X6 for correcting the six data bits 1 through 6 in exclusive "or" gates 31 through 36. The correction bits X1 through X6 are also applied over paths 54 back to stages of the syndrome storage register SSR following the corresponding taps, but not tap $i$-16 for which there is no following stage, for the purpose of preventing the propagation of corrected parity-error bits in syndrome register SSR. That is, signal X1 for bit 1 is applied to syndrome stages following taps $i$-15, $i$-13 and $i$-5. Signal X2 for bit 2 is applied to syndrome stages following taps $i$-9, $i$-4 and $i$, Etc.

In the overall operation of the error detecting and correcting system illustrating one embodiment of the invention, six-bit data words are applied to the inputs in FIG. 1 of encoder shift registers ESR1 through ESR2, and are sent directly out over a communications system to a receiving station. The successive data words propagate through the registers ESR, and signals present at designated taps are applied through the linear modulo 2 adder 20 to produce a parity bit P for transmission. The parity bit P transmitted with a given data word is the result of calculations made on the 16 next preceding data words.

The transmitted code word is received by a decoder in FIG. 2 having decoder shift registers DSR1 through DSR6 coupled to error-correcting output gates 31 through 36. While the data bits propagate through the decoder shift registers, the linear modulo 2 adder 40 computes parity bits for the received data words for comparison with received parity bits generated by the linear modulo 2 adder 20 at the remote encoder. The locally-generated and received parity bits are compared in gate 42, which produces a parity-error signal when they are different. The parity-error bits are propagated through the syndrome storage shift register SSR, and signals from stages thereof are applied to syndrome majority logic threshold detectors 50 for the generation of error-correcting signals X1 through X6. The error-correcting signals are applied to gates 31 through 36 for correcting the data bits 1 through 6 applied therethrough to a utilization device (not shown). At the same time, the error-correcting signals X1 through X6 are applied to appropriate stages of the syndrome storage shift register to correct parity-error signals propagating therethrough.

It will be understood that the specific encoder and decoder for a specific six-bit code described herein is just one of many that may be constructed according to the teachings of the invention to provide a greater protection for high order bits than are provided for low order bits.

APPENDIX

Convolutional Codes

The class of convolutional codes described are majority logic decodable codes with orthogonal syndrome equations. In these codes the parity check bits are the modulo two sum of selected data bits. At the receiver several estimates of the transmitted bit are obtained, the first is the transmitted data bit, and the other estimates are obtained from the parity bits this data bit was used to calculate. A vote is taken among the estimates of the data bit, and the majority is assumed correct. To implement this decision scheme, the receiver's estimate of the received bit and the receiver's estimate of the parity check bits are incorporated in a set of equations called the syndrome equations. The code is orthogonal if the syndrome equations used to determine a particular data bit contain that bit in all of the syndrome equations, but the other received bits in at most one of the equations. This prevents another bit being received incorrectly from affecting more than one equation.

For example, consider a data sequence $a_1, a_2, a_3 \ldots$. The parity check bits for this code are calculated as $b_i = a_i \oplus a_{i-1}$, and the sequence $a_1, b_1, a_2, b_2, a_3, b_3 \ldots$ is transmitted. At the receiver three estimates of $a_1$ are available in the received positions for $a_i$, $b_i$ and $b_{i+1}$. The received estimate for $a_i$ will be called $\hat{a}_i$ and the received estimate for $b_i$, $\hat{b}_i$. The syndrome equations for determining the $i^{th}$ data bit are:

$$S_i = \hat{b}_i \oplus \hat{a}_i \oplus \hat{a}_{i-1}$$

and $$S_{i+1} = \hat{b}_{i+1} \oplus \hat{a}_{i+1} \oplus \hat{a}_i$$

These equations are orthogonal because $a_i$ appears in both equations and the other estimates appear in only one of the two equations. If all of the received estimates are correct $\hat{b}_i = b_i = a_i \oplus a_{i-1}$, $\hat{b}_{i+1} = a_{i+1} \oplus a_i$ and both syndromes are zero. If the estimate of $a_i$ is incorrect, both syndromes are one. If any other estimate is incorrect only one syndrome is one. Therefore, if there is one or fewer errors in the five estimates used in the syndrome calculations, the proper value for $a_i$ can be found. If the probability of an error in an estimate is $P_e$, the probability of error in the corrected estimate is, $$P_{eC} \leq \sum_{i=2}^{5} \binom{5}{i} P_e^i (1-P_e)^{5-i},$$

which, for small values of $P_e$ is approximately, $$P_{eC} \leq 10 P_e^2$$

The syndrome $S_i$ is dependent upon the estimate $\hat{a}_{i-1}$. At the time $\hat{a}_i$ is being corrected, $\hat{a}_{i-1}$ has already been corrected. If, instead of using $\hat{a}_{i-1}$ in calculating $S_i$, the corrected estimate of $\hat{a}_{i-1}$ is used, $P_{eC}$ is reduced to:

$$P_{eC} \leq \sum_{i=2}^{4} \binom{4}{i} P_e^i (1-P_e)^{4-i}(1-P_{eC}) + P_e P_{eC}(1-P_e)^3,$$

which, for small values of $P_E$, is approximately:

$$P_{eC} \leq 6 P_e^2.$$

It would appear that using the corrected estimate, where possible, reduces the probability of error in the corrected bit, and, therefore, the corrected estimate should be used. This is not always the case. Using corrected bits, instead of the receivers estimates of those bits, results in changing the number of ones in the syndromes. For certain codes it is possible, with an error in the last estimate, and no errors in the received bits, for enough syndromes to be changed to incorrectly change the present bit and from this incorrect decision to incorrectly change a future estimate, thereby propagating the error indefinitely. A sufficient condition for error propagation not to occur is that the feedback path on past estimates reduces the total number of ones in the syndrome equations. If this condition is met, the number of ones in the syndrome equations is eventually reduced below the number necessary to change a receiver estimate and the error propagation is limited. In this code, and in the other codes described in this section, this condition on the effect of feedback on the number of ones in the syndrome equations will be met. Therefore, feedback decoding affords the possibility of decreasing the bit error probability without indefinite error propagation. In the error calculations feedback decoding will be assumed.

The class of convolutional codes that will be considered from this point on are those generated by disjoint difference triangles. These are not the only convolutional codes that can be decoded using majority logic schemes. However, using this class of codes, codes with rate N-1/N can be found which can correct any number of errors. This class will be used to evaluate the effect of varying the rate of the code and the error correcting capability of the code. The techniques described for determining the additive patterns for these codes can also be used to determine the additive patterns for other codes.

In this class of codes each N-1 data bits are followed by a parity bit, so that the transmitted sequence is:

$$a_{1,1}, a_{1,2}, \ldots a_{1,N-1}, b_1, a_{2,1}, a_{2,2}, \ldots a_{2,N-1}, b_2, \ldots$$

The parity check bit, $b_i$ is calculated as the modulo two sum of the N-1 data bits preceding it, and certain earlier data bits. The earlier data bits are determined by disjoint difference triangles. The syndrome equations for a particular data bit each contain the modulo two sum of the estimate of a parity bit the data bit was used to calculate, and the estimates of the data bits used to calculate that parity bit. Therefore, if all of the estimates in a syndrome equation are correct the syndrome equation is zero.

The data bit $a_{i,j}$ is used to calculate the $i^{th}$, $i + l_{j,1}$, $i + l_{j,2}, \ldots, i + l_{j,M}$ parity check bits. If the difference between all pairs $(l_{j,r}, l_{j,s})$ is different, and the bit $a_{K,j}$ appears in one of the same parity calculations as $a_{i,j}$ it will not appear in any of the other parity bits $a_{i,j}$ appears in. Therefore, the snydrome equations for $a_{i,j}$ are orthogonal with respect to the bits $a_{K,j}$. The bit $a_{K,j}$ will appear in at most one of the syndrome equations for $a_{i,j}$.

The data bit $a_{i,e}$ is used to calculate $i^{th}$, $i + l_{e,1}$, $i + l_{e,2} \ldots, i + l_{e,m}$ parity check bits. If the numbers $l_{e,r}$ and $l_{j,s}$ are different for all $r$ and $s$ from 1 to M, the bit $a_{i,e}$ will appear in the calculation of the $i^{th}$ parity check bit, but none of the other parity check bits that $a_{i,j}$ appears in. Therefore, the syndrome equations for $a_{i,j}$ are orthogonal with respect to $a_{i,e}$. If, in addition, the differences $(l_{e,r}, l_{e,u})$ are all different from the differences $(l_{j,r}, l_{j,s})$, the bit $a_{K,e}$ will appear in at most one of the same parity bit calculations as $a_{i,j}$, and, the syndrome equations for $a_{i,j}$ will be orthogonal with respect to all data and parity bits.

Numbers with the properties required to make the syndromes of convolutional codes orthogonal form the bases of disjoint difference triangles. These structures have been applied to obtain convolutional codes [9,10], and a large number of them have been tabulated.[10]

To correctly interpret $a_{i,j}$ when $e$ or fewer errors occur, $2e + 1$ estimates of $a_{i,j}$ are necessary. Therefore, in addition to $a_{i,j}$ being transmitted and appearing in the $j^{th}$ parity bit calculation, it must appear in $2e-1$ additional parity check bits. From the $2e + 1$ estimates of $a_{i,j}$, $2e$ syndrome equations are formed, and the estimate $\hat{a}_{i,j}$ is changed if $e+1$ or more of the syndromes are one.

For example, for a rate ¾, double error correcting code there are three data bits preceding each parity bit. Three difference triangles must be constructed, one for each of the data bits. Each of the data bits must appear in $2e-1=3$ parity bit calculations, in addition to the parity bit immediately following it. The additional parity bit calculations, the data bit is used in form the base of the triangles. The differences between the pairs in the triangles form the other rows of the difference triangles. A set of disjoint difference triangles which can be used to construct this code has been found [10], and is:

| | 16 | | | 10 | | | 7 | | |
|---|---|---|---|---|---|---|---|---|---|
| 12 | | 4 | 9 | | 1 | 5 | | 2 | |
| 3 | 15 | 19 | 8 | 17 | 18 | 6 | 11 | 13. | |

The first data bit appears in the parity check calculation immediately following it, and in the parity check calculations 3, 15 and 19 later. Likewise the parity check calculations the second and third data bits appear in are specified by the second and third triangles.

Calling the transmitted parity and data bits:

$$a_{1,1}, a_{1,2}, a_{1,3}, b_1, a_{2,1}, a_{2,2}, a_{2,3}, b_2, \ldots,$$

the $i^{th}$ parity bit is calculated as:

$$b_i = a_{i,1} \oplus a_{i,2} \oplus a_{i,3} \oplus a_{i-3,1} \oplus a_{i-6,3} \oplus a_{i-8,2} \oplus$$
$$a_{i-11,3} \oplus a_{i-13,3} \oplus a_{i-15,1} \oplus a_{i-17,2} \oplus a_{i-18,2} \oplus$$
$$a_{i-19,1}.$$

At the receiver, each time a parity bit is received, a syndrome is calculated as:

$$S_i = \hat{b}_i \oplus \hat{a}_{i,1} \oplus \hat{a}_{i,2} \oplus \hat{a}_{i,3} \oplus \hat{a}_{i-3,1} \oplus \hat{a}_{i-6,3} \oplus \hat{a}_{i-8,2}$$
$$\oplus \hat{a}_{i-11,3} \oplus \hat{a}_{i-13,3} \oplus \hat{a}_{i-15,1} \oplus \hat{a}_{i-17,2} \oplus \hat{a}_{i-18,2} \oplus$$
$$\hat{a}_{i-19,1}$$

To decode $a_{i,1}$, the syndromes $S_i$, $S_{i+3}$, $S_{i+15}$ and $S_{i+19}$ are used. These syndromes are:

$$S_i = \hat{b}_i \oplus \hat{a}_{i,1} \oplus \hat{a}_{i,2} \oplus \hat{a}_{i,3} \oplus \hat{a}_{i-3,1} \oplus \hat{a}_{i-6,3} \oplus \hat{a}_{i-8,2}$$
$$\oplus \hat{a}_{i-11,3} \oplus \hat{a}_{i-13,3} \oplus \hat{a}_{i-15,1} \oplus \hat{a}_{i-17,2} \oplus \hat{a}_{i-18,2} \oplus$$
$$\hat{a}_{i-19,1}$$

$$S_{i+3} = \hat{b}_{i+3} \oplus \hat{a}_{i+3,1} \oplus \hat{a}_{i+3,2} \oplus \hat{a}_{i+3,3} \oplus \hat{a}_{i,1} \oplus \hat{a}_{i-3,3}$$
$$\oplus \hat{a}_{i-5,2} \oplus \hat{a}_{i-8,3} \oplus \hat{a}_{i-10,3} \oplus \hat{a}_{i-12,1} \oplus \hat{a}_{i-14,2} \oplus$$
$$\hat{a}_{i-15,2} \oplus \hat{a}_{i-16,1}$$

$$S_{i+15} = \hat{b}_{i+15} \oplus \hat{a}_{i+15,1} \oplus \hat{a}_{i+15,2} \oplus \hat{a}_{i+15,3} \oplus \hat{a}_{i+12,1} \oplus$$
$$\hat{a}_{i+9,3} \oplus \hat{a}_{i+7,2} \oplus \hat{a}_{i+4,3} \oplus \hat{a}_{i+2,3} \oplus \hat{a}_{i,1} \oplus \hat{a}_{i-2,2} \oplus$$
$$\hat{a}_{i-3,2} \oplus \hat{a}_{i-4,1}$$

$$S_{i+19} = \hat{b}_{i+19} \oplus \hat{a}_{i=19,1} \oplus \hat{a}_{i+19,2} \oplus \hat{a}_{i+19,3} \oplus \hat{a}_{i+16,1} \oplus$$
$$\hat{a}_{13,3} \oplus \hat{a}_{i-11,2} \oplus \hat{a}_{i+8,3} \oplus \hat{a}_{i+6,3} \oplus \hat{a}_{i+4,1} \oplus \hat{a}_{i+2,2} \oplus$$
$$\hat{a}_{i+1,2} \oplus \hat{a}_{i,1}$$

The estimate $\hat{a}_{i,1}$ appears in all four of these equations, while the remaining 48 estimates appear in only one of the equations. Of these 48 estimates, 20 have been corrected before $a_i$ is decoded. Therefore, the error probability is approximately:

$$P_{eC} \leq \binom{23}{3} P_e^3$$

$$P_{eC} = 3654 P_e^3.$$

To decode $a_{i,2}$, the syndromes $S_i$, $S_{i+8}$, $S_{i+17}$ and $S_{i+18}$ are used. To decode $a_{i,3}$ the syndromes $S_i$, $S_{i+6}$, $S_{i+11}$ and $S_{i+13}$ are used. The resultant error probabilities for $a_{i,2}$ and $a_{i,3}$ are 4495 $P_e^3$ and 2024 $P_e^3$, and the average error probability on the data bits is 3400 $P_e^3$.

REFERENCES

[1] Y. Takasaki, M. Tanka, "Line Coding Plan for Fiber Optic Communication System," IEEE Proceedings, July 1975, pg. 1081–1082.
[2] P. A. Franaszek, "Sequence State Coding for Digital Transmission," BSTJ, Nov. 1967, pgs. 143–157.
[3] S. J. Hong, D. L. Ostapko, "Codes for Self-clocking, AC-coupled Transmission: Aspects of Synthesis and Analysis," IBM J. Res. Develop., July 1975, pgs. 358–365.
[4] H. Kobayashi, D. T. Tang, "Application of Partial Response Coding to Magnetic Recording Systems," IBM J. Res. Develop., July, 1970, pgs. 368–375.
[5] P. A. Franaszek, "Sequence-state Methods for Run-length limited Coding," IBM J. Res. Develop., July 1970, pgs. 376–383.
[6] W. H. Kautz, "Fibonacci Codes for Synchronization Control," IEEE Trans. on Information Theory, April 1965, pgs. 284–292.
[7] D. T. Tang, L. R. Bahl, "Block Codes for a Class of Constrained Noiseless Channels," Infor. and Control, 1970, 436–461.
[8] A. Crosier, "Introduction to Pseudoternary Transmission Codes," IBM J. Res. Develop., July 1970, pgs. 354–367.
[9] W. W. Peterson, E. J. Weldon, *Error-Correcting Codes*, MIR Press, 1972.
[10] J. P. Robinson, A. J. Bernstein, "A Class of Binary Recurrent Codes with Limited Error Propagation," IEEE Trans. on Information Theory, January 1967, pgs. 106–113.

What is claimed is:

1. In an error detection and correction system for transmitting data words together with parity bits in a manner providing relatively greater protection for at least the highest order bit of the data word:
   an encoder receptive to the bits of each data word for generating a parity bit according to a self-orthogonal convolutional code constructed by the use of base elements of a difference triangle for each of the bits of the data word, the difference triangles being disjoint, the triangle associated with the highest order bit having a largest number of base elements and the triangle associated with lowest order bit consisting of a single base element, said encoder including:
   an encoder shift register for each bit of the data word, each shift register having outputs from the first stage and from stages displaced from the first stage by amounts equal to the values of the base elements of the triangle associated with the respective data bit, and
   a first parity generating logic which computes the linear modulo 2 sum of said outputs of said encoder shift registers and provides a parity bit output for each data word.

2. The combination according to claim 1, and in addition
   a decoder receptive to code words, each including a data word and an associated parity bit, for comparing received parity bits with locally-generated parity bits and detecting and correcting errors in the data words.

3. An error detection and correction system according to claim 2 wherein said decoder includes
   a decoder shift register for each bit of a received data word, each shift register having outputs from a first stage and from intermediate stages displaced from the input stage by amounts equal to the values of the base elements of the triangles associated with the respective data bits, and from a terminal stage,
   a second parity generating logic which computes the linear modulo 2 sum of the outputs from the first and intermediate stages of said decoder shift registers,
   a syndrome storage register,
   means to compute the modulo 2 sum of each received parity bit with the output of said second parity generating logic and apply the resulting syndrome to the input of said syndrome storage register,
   a syndrome majority logic threshold detector for each bit of the data word, said detectors having inputs from selected stages of said syndrome storage register, and
   an error correcting gate for each bit of the data word, each gate being receptive to the output of the terminal stage of a respective decoder shift register and the output of a respective syndrome majority logic threshold detector, and having an output providing a respective error-corrected bit of the data word.

4. An error detection and correction sytem according to claim 3, and in addition, means coupling outputs of said syndrome majority logic threshold detector to predetermined points in said syndrome storage register to complement syndrome bits therein.

5. An error detection and correction system for transmitting data words together with parity bits in a manner providing relatively greater protection for at least the highest order bit of the data words; comprising
   an encoder receptive to the bits of each data word for generating a parity bit according to a self-orthogonal convolutional code constructed by the use of a difference triangle for each of the bits of the data words, the difference triangles being disjoint, at least the triangle associated with the highest order bit having a larger number of base elements than triangles associated with low order bits, said encoder including:
   an encoder shift register for each bit of the data word, each shift register having outputs from the first stage and from stages displaced from the first stage by the amounts of the values of the base elements of the triangle associated with the respective data bit, and
   a first parity generating logic which computes the linear modulo 2 sum of said outputs of said encoder shift registers and provides a parity bit output for each data word; and a decoder receptive over a transmission path to code words, each including a data word and an associated parity bit from said encoder, for detecting and correcting errors in the data words, said decoder including:

a decoder shift register for each bit of a received data word, each shift register having outputs from a first stage and from intermediate stages displaced from the input stage by amounts equal to the values of the base elements of the triangles associated with the respective data bits, and from a terminal stage, a second parity generating logic which computes the linear modulo 2 sum of the outputs from the first and intermediate stages of said decoder shift registers, a syndrome storage shift register, means to compute the modulo 2 sum of each received parity bit with the output of said second parity generating logic and apply the resulting syndrome to the input of said syndrome storage shift register, a syndrome majority logic threshold detector for each bit of the data word, said detectors having inputs from selected stages of said syndrome storage shift register, and an error correcting gate for each bit of the data word, each gate being receptive to the output of the terminal stage of a respective decoder shift register and the output of a respective syndrome majority logic threshold detector, and having an output providing a respective error-corrected bit of the data word.

6. An error detection and correction system according to claim 5, and in addition, means coupling outputs of said syndrome majority logic threshold detectors to predetermined points in said syndrome storage shift register to complement syndrome bits therein.

* * * * *